9/15/87 OR 4,694,346

United States Patent [19]

Huston

[11] Patent Number: 4,694,346

[45] Date of Patent: Sep. 15, 1987

[54] METHOD AND APPARATUS FOR GATING IMAGE TUBES

[75] Inventor: Alexander E Huston, Berkshire, England

[73] Assignee: Hadland Photonics Limited, Hertfordshire, England

[21] Appl. No.: 759,700

[22] Filed: Jul. 29, 1985

[30] Foreign Application Priority Data

Feb. 27, 1985 [GB] United Kingdom ................. 8505012

[51] Int. Cl.[4] ........................ H04N 5/228; H01J 31/02

[52] U.S. Cl. ...................................... 358/218; 313/414

[58] Field of Search ................................ 358/217-219; 315/12.1, 14, 15; 313/414, 437, 447

[56] References Cited

FOREIGN PATENT DOCUMENTS 1458399 12/1976 United Kingdom .

*Primary Examiner*—L. T. Hix

*Assistant Examiner*—D. Rutledge

*Attorney, Agent, or Firm*—Rosen, Dainow & Jacobs

[57] ABSTRACT

An image tube such as an image inverter including a photo cathode, two grid electrodes, a focus electrode and an anode disposed successively along the image tube is gated by means of the application of a switching pulse to the first of the two grid electrodes while the second of the two grid electrodes is maintained at a positive potential less than that to which the first grid electrode is raised. In this manner over-shoot or ripple in the switching pulse does not disturb the electric field conditions beyond the second grid electrode and accordingly high speed gating can be achieved without effect on the magnification or resolution provided by the image tube.

2 Claims, 2 Drawing Figures

METHOD AND APPARATUS FOR GATING IMAGE TUBES

FIELD OF THE INVENTION

This invention relates to image tubes and more particularly to the gating of an image tube which includes an electrode assembly for forming a focussed image on the screen of the tube. Such an electrode assembly normally includes a focus electrode which, by application of an appropriate potential, shapes the electric field between the cathode and anode in such a way as to produce the properly focussed image. Typically, a focus electrode requires a potential of about 250 volts positive, with respect to the cathode, when the anode potential is 17,000 volts positive with respect to the cathode. The invention is particularly although not exclusively intended for image tubes in which the image on the screen is inverted relative to the optical image applied to the photo cathode.

The invention particularly relates to a method and means for gating such image tubes on and off to provide, for example, a high speed photographic shutter.

BACKGROUND OF THE INVENTION

It is possible to use a focus electrode as a gating electrode to constitute an electronic shutter. Another known technique is to include a single grid electrode in the region between the cathode and the focus electrode and such a grid electrode can be used for gating likewise. However, the use of a focus electrode or a grid electrode in this manner for gating requires that the pulse applied to the electrode to provide shuttering action must have a nearly perfect "rectangular" shape. During the rise and fall times of the pulse, the tube is effectively out of focus and a severe loss of resolution occurs if the rise and fall times occupy a substantial proportion of the total duration of the pulse. Moreover, if the top of the applied pulse exhibits substantial overshoot or ripple, the tube does not remain in optimum focus for the duration of shuttering. Another effect is that the electron-optical magnification of the tube varies as the focus or grid potential changes and so the use of the focus electrode or the single grid electrode for shuttering causes smearing of the image on the screen and has a disastrous effect on the contrast of the image.

It is known from GB-PS No.-1458399 to provide in a streaking or framing image tube a focussing electrode assembly constituted by a conical focussing electrode and, between the photo cathode and the conical focussing electrode, two electrodes constituted by meshes. The first of these electrodes is used as an accelerating electrode. The second electrode recieves an applied potential which is positive relative to the cathode but which is quite low compared with the operating potential applied to the accelerating electrode. Typically the accelerating electrode is spaced by approximately 0.5 mm from the photo cathode and receives an applied potential of 500 volts positive whereas the second electrode may be spaced by 2 mm for the first mesh electrode and receives an applied potential of approximately 50 volts positive relative to the photo cathode. The purpose of the pair of electrodes is to inhibit secondary emission from the first electrode. The potential applied to the second electrode is preferably as low as possible in order that secondary emission from the second electrode is relatively low. The aforementioned patent specification suggests that the second electrode may be used for gating, a decrease in the potential on the second electrode to below that of the photo cathode cutting off the primary electron beam.

The present invention may employ a tube similar to that described in the aforementioned patent specification but the method of operation and the operating circuit appropriate for performing the present invention differ substantially from the arrangements appropriate for controlling the image tube in the manner described in the aforementioned patent specification.

SUMMARY OF THE INVENTION

The present invention provides a method of gating an image tube which includes a cathode, a screen, an electrode assembly for forming a focussed image on the screen and first and second electrodes disposed successively along the image tube between the photo cathode and the said electrode assembly. According to the invention, the method comprises raising the potential of the first grid to allow the passage of electrons beyond the first grid for a short interval of time and maintaining the potential on the second grid, at least during said interval, at a constant potential less than that to which the first grid is raised, whereby irregularity or variation in the potential of the first grid during said interval does not substantially disturb electric field conditions produced by the electrode assembly.

The invention also provides imaging apparatus comprising an image tube including a photo cathode, a screen, an electrode assembly for producing a focussed image on the screen, first and second electrodes being disposed successively along the image tube between the photo cathode and the said electrode assembly, and a gating circuit comprising means for maintaining the said second electrode at a predetermined positive potential relative to the cathode and means for switching the first electrode between a potential causing inhibition of the flow of electrons past the first electrode and a second potential which permits the said flow of electrons and is greater than the said predetermined potential.

DESCRIPTION OF A PREFERRED EMBODIMENT

Figure 1:
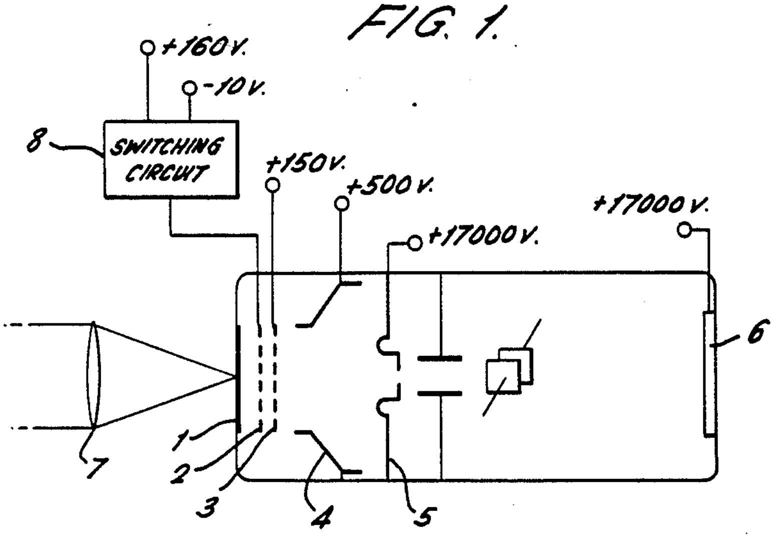
FIG. 1 is a schematic drawing of an image tube.

FIG. 1 illustrates an image tube having at one end a photo cathode 1, first and second electrodes 2 and 3 respectively, preferably in the form of similar meshes and arranged so that electrons from the photo cathode must transverse both electrodes in the passage of electrons down the image tube. The tube includes an electrode assembly constituted by a focussing electrode 4 and an anode 5. The tube would normally include deflector plates as shown. At its other end the tube includes a screen 6, preferably a phosphor screen. The tube may be of the construction described in GB-PS No.-1458399. The image formed on the screen may be inverted with respect to an image projected onto the photo cathode. It is known to provide an optical system which projects an image on the photo cathode. Such an optical system is shown, purely diagrammatically, at 7.

For a correctly forcussed image, the typical operating potentials for a tube as shown in FIG. 1 are as follows, all potentials being stated relative to the photo cathode. The first and second grids should be at 160 volts positive and 150 volts positive respectively, the focus electrode should be at 500 volts positive and the anode should be at 17,000 volts positive. Obviously, these particular operating potentials may vary according to the particular design of the tube; typically the potential on the first and second electrodes should be comparatively low compared with the potential on the focus electrode and very much lower than the anode potential.

Figure 2:
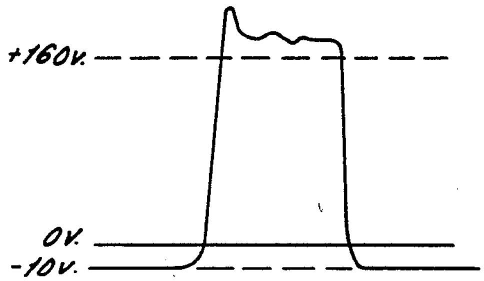
FIG. 2 illustrates a typical gating pulse.

In operation of the tube, the potential of the second grid 3, as well as the potentials of the photo cathode, the focus electrode and the anode is held constant and a gating pulse is applied to the first grid 2. A typical pulse is shown in FIG. 2 and rises from a base level which is negative with respect to the photo cathode (so that the tube is cut off) and rises to a potential, such as 160 volts in this example, appropriate to allow a flow of electrons and in excess of the potential applied to the second electrode. However, by maintaining constant potentials between the cathode, second electrode, focus electrode and anode, the field conditions remain substantially constant so long as the potential of the first electrode exceeds that of the second electrode by about 10 volts and, during gating, neither the magnification nor the resolution of the image tube is substantially affected even if the potential on the first electrode should substantially exceed 160 volts or should exhibit irregularity such as over-shoot or ripple.

It is accordingly feasible to obtain a satisfactory gating at much higher speeds than was formerly possible, because the requirement for an ideally shaped pulse is no longer paramount. The pulse shape shown in FIG. 2 is acceptable because, as mentioned, the over-shoot on the leading edge of the pulse has no detrimental effect and it is a relatively simple matter to provide rapid rise and fall times of the pulse if over-shoot is permitted. In particular, gating times less than $10^{-8}$ seconds are obtainable; it has previously been necessary to produce nearly ideally-shaped pulses for satisfactory gating with gating times less than $10^{-7}$ seconds.

The operating circuit for the tube shown in FIG. 1 comprises the voltage sources of +500 volts for the electrode 4 and +17000 volts for the anode 5 and the screen 6. A voltage source at +150 volts is shown for the grid 3; this source or, if preferred, a more complex arrangement is provided for maintaining the potential of the second electrode 3 substantially constant at least during the period of gating. A switching circuit 8 coupled to a negative voltage source of −10 volts and a positive source of +160 volts provides, in any suitable manner, a switching pulse in response to which the potential of the first electrode 2 is raised from a potential (−10 volts) inhibiting the flow of electrons beyond the first electrode to a potential (+160 volts) which permits such flow and exceeds (for example by about 10 volts) the constant potential applied to the second electrode 3.

Although gating is possible if the potential of the first electrode is raised to a value less positive than that of the second electrode, the known disadvantages of grid gating, viz., loss of resolution and variation of magnification are not then avoided. While the potential of the first electrode significantly exceeds that of the second electrode secondary emission from the first electrode will be inhibited but such secondary emission is incidental and forms no part of the claimed invention.

I claim:

1. A method of gating an image tube including a cathode, screen, an electrode assembly for forming a focussed image on said screen and first and second electrodes disposed successively along said image tube between said photo cathode and said electrode assembly, said first electrode being disposed nearer to said cathode than is said second electrode, said method comprising:

gating said first electrode by raising for a short interval of time the potential of said first electrode relative to said cathode, said raised potential allowing passage of electrons beyond said first electrode for said short interval of time; and maintaining a constant level of potential on said second electrode at least during said time interval, said constant level being less than said raised potential applied to said first electrode, irregularity or variation in said potential of said first electrode during said interval not disturbing electric field conditions produced by said electrode assembly in said image tube.

2. Imaging apparatus comprising:

an image tube including a photo cathode, screen, an electrode assembly for producing a forcussed image on said screen, and first and second electrodes disposed successively along said image tube between said photo cathode and said electrode assembly, said first electrode being disposed closer to said cathode than is said second electrode; and gating circuit means for maintaining said second electrode at a predetermined positive potential relative to said cathode and for switching said first electrode between a first potential level relative to said cathode and a second potential level relative to said cathode, flow beyond said first electrode of electrons from said cathode being inhibited at said first potential level, flow past said first electrode of electrons from said cathode being allowed at said second potential level, said second potential level being greater relative to said cathode than said predetermined potential of said second electrode relative to said cathode.

* * * * *